May 26, 1959 — A. H. RALPH ET AL — 2,887,753
FASTENING DEVICE
Filed June 24, 1954 — 2 Sheets-Sheet 1
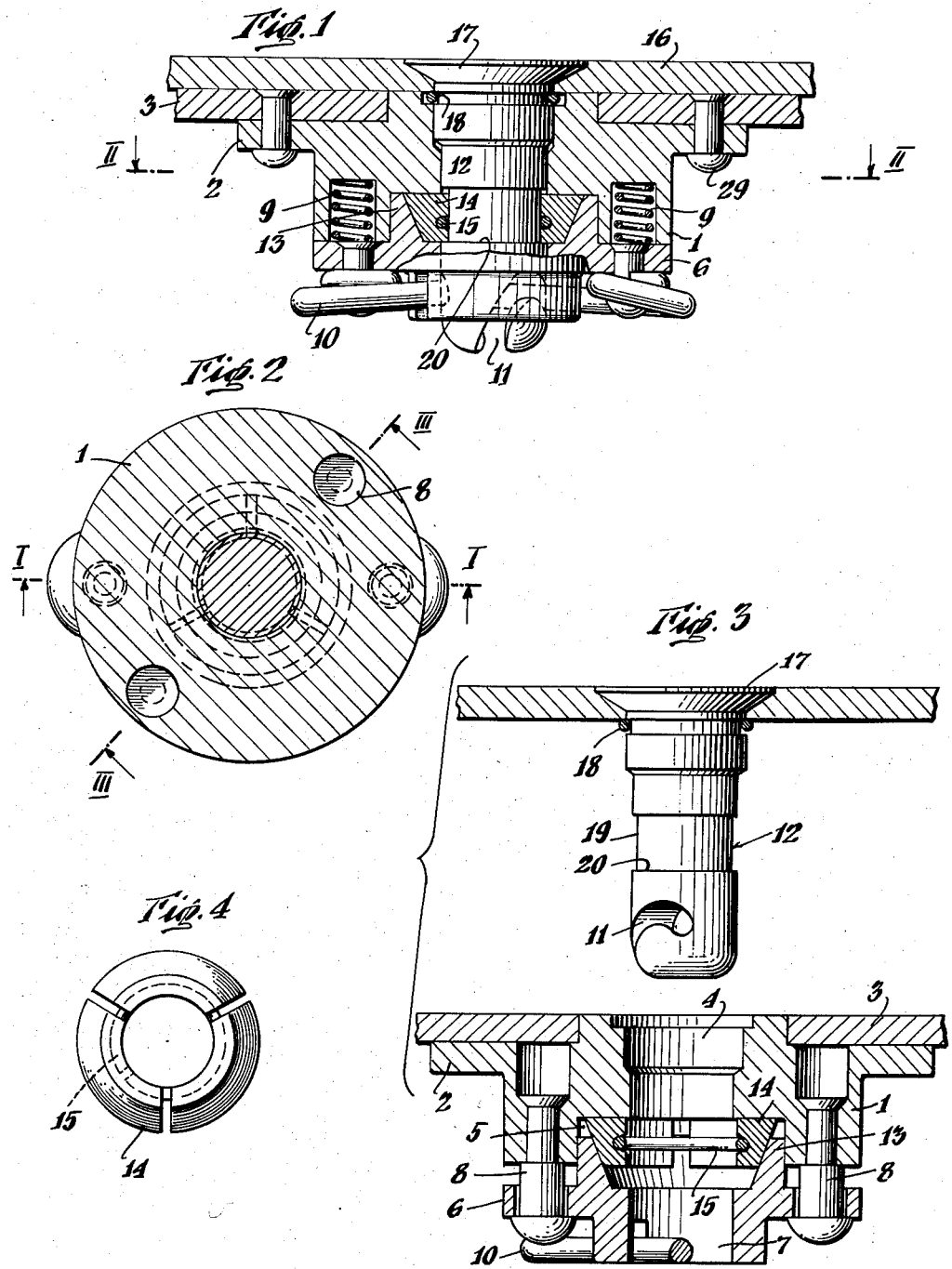
INVENTORS
Arthur Henry Ralph
Cyril William Langley
BY
ATTORNEY

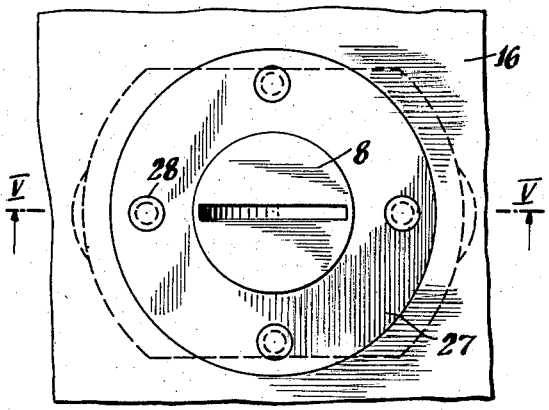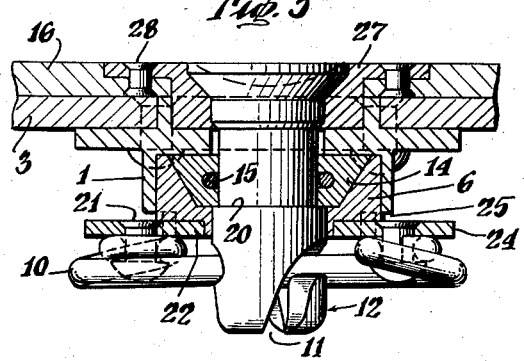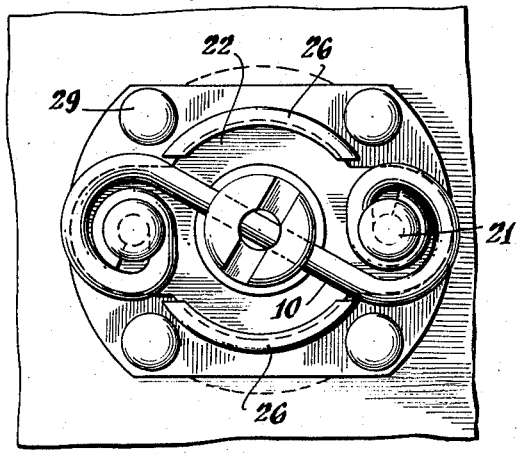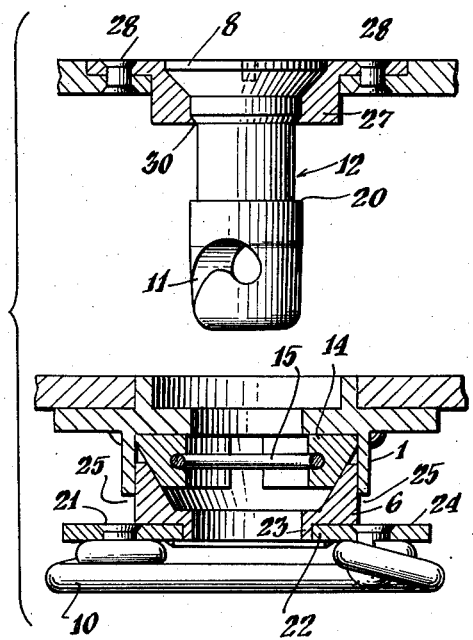

United States Patent Office 2,887,753
Patented May 26, 1959

2,887,753

FASTENING DEVICE

Arthur Henry Ralph and Cyril William Langley, Farnham, England, assignors to Dzus Fastener Co., Inc., Babylon, N.Y., a corporation of New York Application June 24, 1954, Serial No. 438,932

2 Claims. (Cl. 24—221)

This invention relates to a fastening device for releasably securing together two articles or parts.

The fastening device is of the kind comprising a stud member carried by one of the articles or parts, and a receptacle member which is secured to the other article or part and carries a resilient element with which the stud member can engage, engagement and disengagement of the two members being effected by partial rotation of the stud member in one direction or the other relatively to the receptacle member.

In the known fasteners of this kind, there is always the possibility of slight axial movement, after locking, if the resilient member is compressed beyond its normal locking pressure, as may happen when the parts to which the fasteners are attached are violently pulled apart. Owing to this possibility of axial movement and also owing to their lateral stability being insufficient, the known fasteners are not adapted to resist very high shear stresses.

The primary object of the invention is to provide an improved fastener of the kind set forth for which the possibility of axial as well as lateral play or movement between the parts is positively prevented when the fastening device is in its locked position. A further object is to provide a fastener which is capable of withstanding high shear stresses.

According to the invention, relative axial movement between the parts when the fastener is in its locked position is positively prevented by a member which, in the locked position of the fastener, is in engagement both with the stud member and with the receptacle member.

In a preferred arrangement, the fastener comprises a chuck in the form of a collar which is made in a number of segments, for example three. The segments surround the stud member and are tapered conically at their outer periphery and are supported in a recess, the periphery of which is correspondingly tapered in an axially movable member carried by the receptacle member. The segments are urged outwardly by means of a spring circlip and, when the fastener is unlocked, are disengaged from the stud member, but when the fastener is in its locked position, the segments engage behind a shoulder on the stud member and receptacle member and thereby prevent relative axial movement between the two members.

In order that the invention may be easily understood and readily carried into effect, two forms of a fastening device constructed in accordance with the invention are illustrated, by way of example, in the accompanying drawings, in which:

Fig. 1 is a vertical cross-section on the line I—I of Fig. 2 showing one form of fastening device embodying my invention in fastened condition;

Fig. 2 is a horizontal sectional view of the fastening device on the line II—II of Fig. 1;

Fig. 3 is a vertical cross-section on the line III—III of Fig. 2, showing the device in unfastened condition with the stud separated from the receptacle;

Fig. 4 is a plan view of the collar which forms part of the receptacle;

Fig. 5 is a vertical cross-section on the line V—V of Fig. 6 showing a modified form of fastening device;

Fig. 6 is a plan view of the fastening device shown in Fig. 5;

Fig. 7 is a bottom plan view of the device shown in Fig. 5; and

Fig. 8 is a sectional view similar to Fig. 5, but showing the device in unfastened condition with the stud separated from the receptacle.

Referring to Figs. 1–4 of the drawings, the fastener comprises a receptacle member in the form of a housing 1 having a flange 2 by which it is attached to one of the parts 3 to be fastened. The housing has a central bore 4 having at one end a counterbore 5 in which a pressure cup 6 is axially movable.

The pressure cup has a central bore 7 co-axial with the bore 4 in the housing and is guided for axial movement on studs 8 which are fixed to the housing 1. The pressure cup 6 is urged away from the housing 1 and part 3 by means of a pair of helical springs 9 which are housed in recesses in the housing 1 and bear against a flange on the pressure cup. To the outside of the pressure cup 6 is attached the usual S-spring 10, the bar of which extends across the central bore 7 for engagement by a cam slot 11 in the stud member 12 of the fastener.

The pressure cup 6 comprises an annular part 13 which projects upwardly above its flange and engages in the counterbore 5 in the housing and the inner periphery of the part 13 is conical. In the space within the annular part 13 is disposed an annular collar 14 which is split radially into a plurality—as for instance three segments. The outer periphery of the collar is conical to conform to the inner conical surface of the part 13 and its inner periphery is formed with a groove in which is fitted a spring circlip 15 which tends to move the sections of the collar outwardly.

The stud member 12 is of the usual construction and is passed through a bore in the part 16 to be fastened to the part 3 and through the central bore 4 in the receptacle member. The cam slot 11 of the stud is engageable with the bar of the S-spring 10 attached to the pressure cap 6. The opposite end of the stud is provided with a head 17 which engages with a countersink in the part 16. The shank of the stud is surrounded adjacent the head 17 by a circlip or split retaining ring 18 by which it is retained in position. The shank of the stud is provided adjacent the collar with a peripheral recess 19, or part of smaller diameter than the remainder of the shank, in which the collar can engage.

In operation, when the fastener is unlocked by rotating the stud counter-clockwise relatively to the receptacle, the pressure cup 6 drops downwardly under the action of the two springs 9 acting on its flange, with the result that the segements of the collar 14 are pushed apart by the spring circlip or split ring 15 and disengaged from the recess in the stud, as shown in Fig. 3 which enables the stud and the part 16 attached to the stud to be removed from the receptacle and part 3. The pressure cup is guided in its movement by the two studs 8 fixed to the housing 1 which, at the same time, prevent it from turning.

In order to lock the parts, after the stud has been passed through the bore in the receptacle member and the cam slot in the stud has been engaged with the bar of the spring 10, the stud is rotated in a clockwise direction and, during the first stage of its movement, the pressure cup is drawn up against the pressure of the two helical springs 9, whereby, owing to the engagement of the conical surface of the annular part 13 of the pressure cup with the conical surface of the collar 14, the segments of the collar are moved inwardly to engage in the recess in the shank of the stud. As the rotation of the stud is continued, the S-spring 10 is compressed in the usual way until its bar passes over the top of both fastening cams on the end of the stud and drops into the locking seats, whereby the parts are locked together. In the locked position one end face of the collar 14 engages behind a shoulder 20 on the stud formed by the recess 19 therein, and the opposite end face bears against the end of the counterbore in the housing 1, so that axial movement of the stud relatively to the housing is positively prevented. The bore 4 in housing 1 and the bore 7 in pressure cup 6 are preferably formed to provide a snug fit with stud 12 and when the fastener is locked the collar 14 tightly embraces the recess 19 of the stud. Thus, the shank of the stud is supported through the greater part of its length and this, together with the impossibility of axial displacement, ensures a high resistance to shear.

The modified form illustrated in Figs. 5–8, is similar to that of the Figs. 1–4 and like reference numerals have been used to denote like parts. The fastener assembly shown in these figures has, however, the following differences.

The S-spring 10, instead of being attached to a flange of the pressure cup 6, is attached by rivets 21 to a plate 22. The plate 22 has a circular aperture, which engages around an annular projecting part 23 of the pressure cup 6, and two laterally projecting ears 24 which are movable in diametrically opposite slots 25 in the housing 1. The lower end of the housing 1 is staked over, as shown at 26 in Fig. 7, so as to prevent the plate carrying the spring 10 from being separated from the housing 1.

The action is similar to that previously described, when the stud is disengaged from the spring 10 the collar is expanded by the spring circlip 15 and the parts assume the position shown in Fig. 8 enabling the stud to be removed. When the stud is engaged with the spring and turned to engage the spring in the locking grooves in the stud the parts take up the position shown in Fig. 5 in which one face of the collar 14 bears against the end of the counter-bore in the housing 1 and the opposite face engages behind the shoulder 20 in the stud.

In this form of the fastener, instead of the circlip 18, the stud is mounted in a retaining cup 27 which is fixed by rivets 28 to the part 16. The retaining cup 27 is staked over, as shown at 30, so as to prevent the stud being separated from the cup 27.

In both forms the housing 1 is attached by rivets 29 to the part 3.

It will thus be seen that we have provided an improved fastening device having high strength both in shear and tension and which has a minimum amount of both axial and lateral movement.

Modifications may be made in the illustrated and described embodiments of the invention without departing from the invention as set forth in the accompanying claims.

We claim:

1. A quick-acting, self-locking fastener assembly comprising a fastener stud having a head at its inner end, fastening means including a spiral cam slot extending inwardly from its outer end and a shank extending therebetween, said shank having a portion of reduced diameter intermediate its ends with a shoulder portion at the outer end of the reduced portion facing towards the head; and a fastener receptacle having a relatively fixed mounting portion formed with an opening to receive the stud, a fastening portion including a spring mounted cross bar releasably engageable with the spiral cam slot on the stud and non-rotatably supported by and shiftable axially with respect to the mounting portion as said cross bar is engaged with the said spiral cam slot of the stud, a contractible and expansible segmental collar supported by the mounting portion adjacent the opening so that the shank portion of the stud may be inserted through said collar and said opening, and cam means associated with the fastening portion of the receptacle in operative engagement with the contractible and expansible collar and shiftable axially of the receptacle upon interengagement of the spiral cam slot of the stud with the cross bar of the receptacle thereby to cause the collar to contract and engage the reduced shank of the stud immediately inside the shoulder whereby the interengagement between the collar and reduced shank portion limits movement of the stud in shear and the interengagement between the collar and shoulder limits movement of the stud in tension.

2. A quick-acting, self-locking fastener assembly as set forth in claim 1 in which spring means are interposed between the mounting portion of the receptacle and the fastening portion and camming means whereby the fastening portion and camming means are normally maintained in outwardly spaced relationship with respect to the mounting portion but are shiftable axially inwardly when the fastening portion is engaged by the fastening means of the stud.

References Cited in the file of this patent

UNITED STATES PATENTS

| 897,168 | Smith | Aug. 25, 1908 |
| 1,005,227 | Jones | Oct. 10, 1911 |
| 1,201,651 | Thompson | Oct. 17, 1916 |
| 1,607,274 | Hecht | Nov. 16, 1926 |
| 2,123,764 | Berry | July 12, 1938 |
| 2,276,694 | Henry | Mar. 17, 1942 |
| 2,514,113 | Zahodiakin | July 4, 1950 |
| 2,576,579 | Donovan | Nov. 27, 1951 |

FOREIGN PATENTS

| 604,017 | Great Britain | June 28, 1948 |
| 902,085 | France | Aug. 17, 1945 |
| 941,822 | France | Jan. 21, 1949 |